United States Patent [19]

Wilder et al.

[11] 3,826,067

[45] July 30, 1974

[54] FILTER

[75] Inventors: Harry D. Wilder, Midlothian; Homan B. Kinsley, Jr., Richmond, both of Va.

[73] Assignee: Ethyl Corporation, Richmond, Va.

[22] Filed: Apr. 5, 1972

[21] Appl. No.: 241,150

[52] U.S. Cl............ 55/524, 55/498, 55/527, 55/DIG. 30, 60/311, 106/84, 264/122
[51] Int. Cl................................ B01d 27/06
[58] Field of Search ........... 55/524, 527, 487, 498, 55/DIG. 30; 210/508, 509; 106/84; 264/122, 128; 60/311

[56] References Cited
UNITED STATES PATENTS

| | | | |
|---|---|---|---|
| 2,871,977 | 2/1959 | Kling | 106/84 |
| 3,248,237 | 4/1966 | Weldes et al. | 106/38.35 |
| 3,594,993 | 7/1971 | Heyse | 55/524 |
| 3,745,748 | 7/1973 | Goldfield et al. | 55/527 |

*Primary Examiner*—Bernard Nozick
*Attorney, Agent, or Firm*—Donald L. Johnson; Robert A. Linn; Joseph D. Odenweller

[57] ABSTRACT

Described herein is a porous filter mat comprising glass fibers and a quaternary ammonium silicate binder. Optionally, the mat contains asbestos or micro-glass fibers which reduce the porosity of the mat to the level required for the particular filtration. Filter elements made from the mat have good structural integrity even at high temperatures. The filter mat is used to remove particulates from the exhaust of an internal combustion engine.

14 Claims, 7 Drawing Figures

FILTER

BACKGROUND

Filter mats have long been used for removing particulates from liquid or gas streams. Such filters have been made from various materials such as glass fiber, cellulose, polyamide fiber, and the like, including both random and woven mats. When such filters are used in high temperature environments such as encountered in automotive engine exhaust they rapidly fail due to the effect of heat and also the physical flexing caused by the pulsating gas stream. Glass fiber mats have some of the attributes required of a filter in such a high temperature environment but still deteriorate after a short time due in part to the constant flexing of the glass fibers by the pulsating stream.

In an attempt to reduce this physical deterioration, binders have been applied to the glass fiber mat to prevent shifting of the fibers when the mat is flexed. When organic binders such as phenolic resins, polyacrylate resins, and the like are used, they tend to burn off at the temperature encountered in engine exhaust gas (up to about 1,000°F.). Inorganic binders such as sodium silicate have shown good adherence to the glass fibers and are resistant to the temperatures in exhaust gas. Unfortunately, the caustic nature of sodium silicate causes chemical degradation of the glass fibers, leading to premature break-up. Hence, a need exists for a glass fiber filter mat that can maintain good physical integrity over extended periods even when subject to the high temperature pulsating environment of an exhaust gas stream.

SUMMARY

The invention comprises a glass fiber filter mat in which the glass fibers are bound by a quaternary ammonium silicate binder. The mat may be woven or random. Other finer fibers can optionally be included in the mat structure to reduce the porosity of the final mat such that the mat will retain the particles it is intended to remove. The invention also includes an exhaust system for an internal combustion engine which includes a filter in which the filter element is the new glass fiber mat.

DESCRIPTION OF THE PREFERRED EMBODIMENTS

Figure 1:
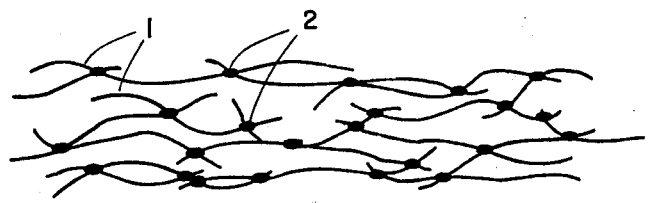
FIG. 1 shows a cross-section of a random glass fiber mat.

In FIG. 1, long glass fibers 1 are randomly entangled to form a porous glass fiber mat. A major amount of the fibers are over one-half inch in length and, preferably, several inches in length, e.g., 2–3 inches. The individual fibers contact each other at many points 2, at which points a quaternary ammonium silicate binder has collected and adheres to both glass fibers.

Any quaternary ammonium silicate can be used with good results including, but not limited to, ortho- and meta- silicates and polymeric silicates. Useful classes of quaternary ammonium silicates are described in detail in U.S. Pat. Nos. 2,689,245; 3,239,521; and 3,248,237, the disclosure of which is fully incorporated herein. Preferably the silicate is water-soluble or waterdispersible, since this makes application to the glass fiber simple. One need only immerse or spray or otherwise contact the glass mat with a solution or dispersion of the quaternary ammonium silicate.

Preferred quaternary ammonium silicates are those having an Si/N atom ratio of from 0.25 to 15. Of these, the more preferred are those having a ratio of from about 0.50 to 8.

A wide range of tertiary amines can be used as the amine moiety of the quaternary ammonium silicate. These include mono-, di- and poly-amines. Representative examples are trimethyl amine, triethyl amine, tributyl amine, dimethyldodecyl amine, pyridine, N,N,N-',N'-tetramethylethylenediamine, triethanol amine, N-ethyl morpholine, N-ethanol morpholine, and the like.

A preferred class of ammonium moieties are those derived from the trialkyl amines in which the alkyl groups contain from 1 to about 50 carbon atoms. In addition to the above exemplified material, these include tripropyl amine, trioctyl amine, methyldidodecyl amine, diethylcetyl amine, dimethyleicosyl amine, dimethyl tricosyl amine, dimethyl tetracosyl amine, dimethyl pentacosyl amine, and the like. Of these, the most preferred are those that provide water-soluble quaternary ammonium silicates and have an Si/N atom ratio of from about 0.5 to 8.

The most preferred quaternary ammonium silicates are the alkanol ammonium silicates wherein the alkanol moieties contain from 2 to about 20 carbon atoms. Examples of these are: tetraethanol ammonium silicate, tetraethanol piperazinium silicate, diethanol morpholinium silicate, hexaethanol ethylene diammonium silicate and tetra-(2-hydroxyproyl) ammonium silicate. Of the above, the most preferred are the tetraalkanol quaternary ammonium silicates.

The glass fibers used to prepare the mat are coarse fibers, most of which are from 5 to about 15 microns in diameter. A preferred range is from about 7–10 microns, and excellent mats are prepared using glass fibers having an average diameter of about 9 microns. The fibers should be long enough so that they contact a large number of other fibers which results in a stronger filter sheet. They should be over one-half inch long, and preferably over 1 inch long. Maximum length is not too critical except that fibers of extreme length are not readily formed into mats by the dry or wet lay process to be described. Good results are obtained using a chopped glass fiber having an average length of about 1–5 inches and more preferably from 2–3 inches.

Figure 3:
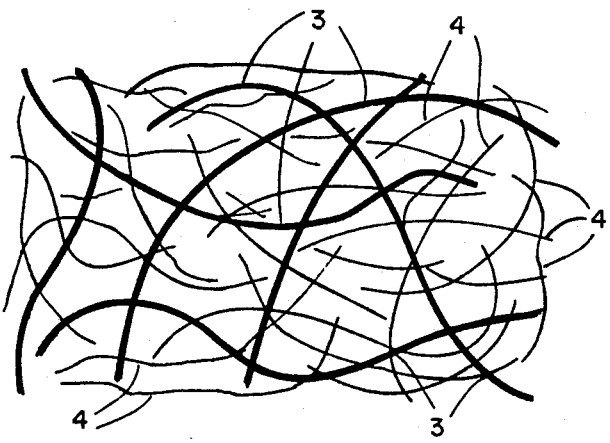
FIG. 3 is a surface view of glass fiber mat containing reinforcing glass fiber bundles.
Figure 4:
FIG. 4 is a cross-section of one of the fiber bundles.

In a particularly preferred embodiment a quantity of fiber bundles are included in the mat. They serve to reinforce the mat. This is illustrated in FIGS. 3 and 4. FIG. 3 is the surface of a mat containing a number of fiber bundles 3 intermingled with the normal glass fiber monofilaments 4. In FIG. 4, the fiber bundles are shown to consist of a number of individual fibers 5.

The glass fiber mat can be readily made using conventional paper-making techniques by filtering an aqueous suspension of fiber glass on a moving wire screen. A preferred method is the "dry lay" process which allows the use of longer glass fibers. In the dry lay process the glass fibers are suspended in an air stream and filtered dry through a moving wire screen. The rate of moving is adjusted to give the desired mat thickness, which in general ranges from about 0.005 to 0.075 inch, more preferably from 0.010 to 0.050 inch. A preferred method of monitoring the fiber mat laid down is by density. A preferred range is from 1 to about 3 pounds per 100 square feet.

A glass mat formed as above has poor integrity and tends to come apart. It requires the application of a binder. This can be accomplished by either spraying with, or dipping the mat in, a solution of quaternary ammonium silicate and drying the resulting mat. Heat is usually applied to hasten drying. This results in a glass fiber mat having good structural integrity. Another method is to apply an organic binder to the initial mat and then process the mat into its desired form. Then the quaternary ammonium silicate is applied and the element is heated. The following example illustrates the preparation of a glass fiber mat of the present invention.

EXAMPLE 1

Glass fibers having a diameter of from 2–10 microns and a length of from one-half to 3 inches are suspended in a rapidly moving air current. The air is passed through a moving wire screen. The movement of the screen is adjusted such that the mat thickness formed on the screen is about 0.05 inch. The sheet of glass fiber mat that forms is continuously removed from the moving screen and immersed in a 10 per cent aqueous solution of tetraethanol ammonium silicate. The sheet is then dried, resulting in a glass fiber mat of good structural integrity suitable for use as a filter element in high temperature environments.

Other quaternary ammonium silicates can be used in the above example with good results.

The porosity of a glass fiber mat made using the preferred long coarse fibers is generally quite high. This is satisfactory in many applications. If it is desired to remove fine particles, for example, in the 1–10 micron range and lower, it is preferred to reduce the porosity of the mat by adding to it a fine fiber. The fine fibers are preferably inorganic fibers such as asbestos, microglass fibers (approximately 1 micron or less in diameter), alumina fibers. Of these, the preferred fibers are asbestos fiber and microglass fiber having a diameter under 1 micron and a fiber length of about 10 microns to one-quarter inch. The amount added depends upon the filter application and is readily determined experimentally. When the fine fiber is added to the glass fiber mat the fine fibers do not merely coat the glass mat, but tend to infiltrate it, forming a fine fiberimpregnated glass fiber mat in which the fine fibers are concentrated near one surface and gradually decrease in concentration towards the other surface of the mat. When mats prepared in this manner are used in filter applications it is sometimes preferred to use as the initial filter surface the opposite surface from the one to which the fine asbestos fiber was added. In this manner, the coarse particulates in the media being filtered are first removed in the more porous fine fiber lean area of the filter, allowing the finer particulates to be removed in the inner portion of the filter. In this manner, the entire thickness of the filter is utilized, thus filter plugging is retarded.

Figure 2:
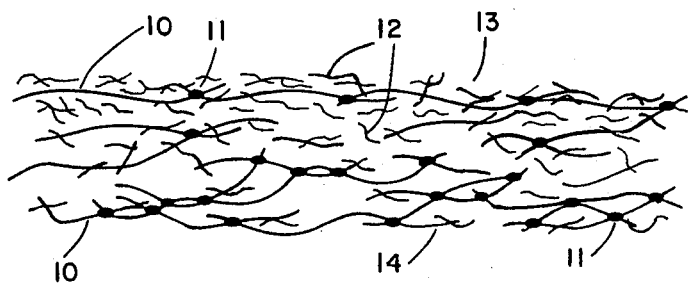
FIG. 2 shows a cross-section of a similar mat impregnated with additional fine fibers.

This embodiment of the invention can be seen in FIG. 2. The long glass fibers 10 are entangled, forming the initial mat. They are 2–3 inches long and about 5–10 microns in diameter. These are bonded together by the quaternary ammonium silicate at contact points 11. Distributed within the mat are fine asbestos fibers 12. These fine fibers are more dense at one surface of the mat 13 and tend to decrease in concentration towards the other surface 14 of the mat. In use, the mat is preferably positioned such that the media to be filtered enters the mat at surface 14 and exits at surface 13, although this is not required.

The fine fibers can be added either before or after binding the mat with the quaternary ammonium silicate binder. In one preferred embodiment an organic binder is first applied to the initial glass fiber mat. Suitable organic binders include phenol-formaldehyde resins, polyacrylate resins, acrylate resins, melamine resins, alkyd resins, epoxy resins, and the like. After the organic resin is dried or otherwise cured the fine fiber is added using either a wet or dry lay process. The wet lay process is preferred at this stage. In the wet process a water suspension of the fine fiber is passed through the glass mat causing the fine fibers to penetrate the glass mat in the same manner as previously described such that it is more concentrated at one surface and gradually decreases in concentration towards the opposite surface. At this stage the mat can be readily fabricated into its desired form such as a pleated filter element. Then a quaternary ammonium silicate is applied and the element dried, resulting in the final filter. This procedure is illustrated in the following example.

EXAMPLE 2

A quantity of glass fibers 2–3 inches long and about 9 microns in diameter are metered into a moving air stream. The air stream containing the glass fiber is passed through a moving screen forming a random glass fiber mat on the screen about 0.050 inch thick. The mat is sprayed with a methanol solution of a phenol-formaldehyde resin and dried, forming an organically bonded mat. An aqueous suspension of fine asbestos fiber is then passed through the glass mat with the asbestos being retained on and within the glass mat, thus reducing its porosity. When the desired porosity is achieved the mat is cut into a sheet size of 12 inches by 6 feet and passed through pleating rollers which form 1-inch pleats across its 12-inch dimension. The ends of the pleated sheet are then overlapped, giving a tubular pleated filter element. This element is immersed in an aqueous solution of tetraethanol quaternary ammonium polysilicate. The shaped filter is then passed through a drying oven, giving a pleated filter element suitable for use at high temperatures.

EXAMPLE 3

A quantity of glass fibers 2–3 inches long and from 7–10 microns in diameter are metered into a moving air stream. The air stream containing the glass fibers is passed through a moving screen, forming a random glass fiber mat on the screen. The screen is advanced at a rate such that the glass fibers deposited on the screen form a mat 0.05 inch thick. The mat is sprayed with an aqueous solution of tetraethanol quaternary ammonium silicate and then dried. Following this, an aqueous slurry of fine asbestos fibers (under 1 micron in diameter) is filtered through the mat, causing the asbestos fibers to be deposited on and within the glass fiber mat. The asbestosimpregnated mat is then formed into a filter element and dried, resulting in a filter element suitable for use in filtering particulates from the exhaust stream of an internal combustion engine.

FIG. 3 shows a typical exhaust system for an internal combustion engine which includes an exhaust filter. Engine 20 connects through exhaust pipe 21 to standard muffler 22. The outlet of muffler 22 connects through conduit 23 to the tangential inlet 25 of standard cyclone type inertial separator 24. Exit tube 26 extends axially into the cyclone separator past the entry port. Collection can 27 communicates with trap 24 and is located near the apex of the conically-shaped cyclone housing. Cyclone type inertial separators are well known and their construction is described in many standard texts.

Figure 5:
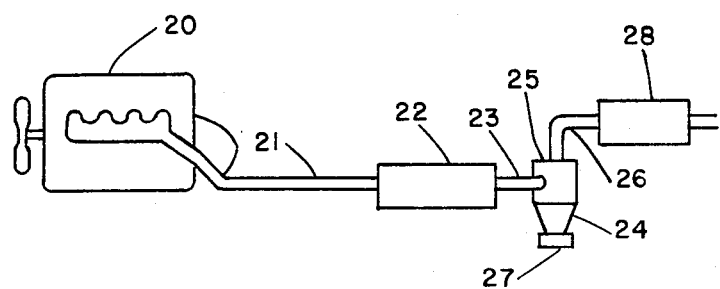
FIG. 5 shows schematically an internal combustion engine exhaust system including a cyclone particulate separator and an exhaust gas filter.

Exit tube 26 connects the separator to entry port 30 of filter 28. The structure of filter 28 is shown in FIGS. 4 and 5. It comprises a cylindrical housing 31 having an entry port 30 at one end and an outlet 32 at its other end. Axially located within housing 31 is tubular screen 33 which is fastened securely to end wall 34 of housing 31. Circular non-perforate disc 35 is attached to the other end of screen 33 and has a greater diameter than screen 33. Fitted snugly around screen 33 is pleated filter element 36 which seals against disc 35 and end wall 34.

In operation, exhaust gas from engine 20 is conducted through exhaust pipe 21 to muffler 22, which muffles the sound level of the exhaust. From muffler 22 the exhaust is conducted to tangential inlet 25 of cyclone separator 24. The exhaust spirals down the cyclone chamber throwing particulates against the chamber wall. When it reaches the apex area of the cyclone chamber the exhaust gas reverses direction and spirals up inside the outer vortex and enters exit tube 26. Most of the particulate matter in the exhaust drops into can 27. The partially cleaned exhaust gas containing very fine particulates is conducted by tube 26 through entry port 30 into housing 31. This housing is substantially closed and the exhaust gas is forced through the pores in filter element 35 which removes substantially all the remaining particulates. The cleaned exhaust gas then passes through screen 33 and exits at outlet 32. The clean exhaust gas can be vented to the atmosphere or, optionally, conducted through one of the many well-known catalytic units which serve to contact the exhaust gas with a catalyst to reduce the carbon monoxide, hydrocarbon and nitrogen oxide content of the exhaust gas.

Figure 6:
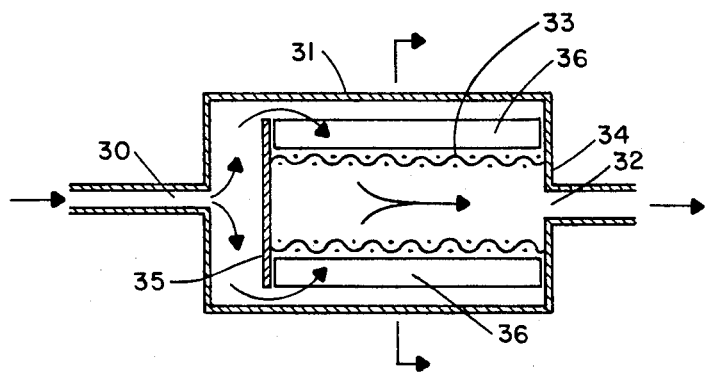
FIG. 6 is a longitudinal cross-section showing a typical construction of a filter.
Figure 7:
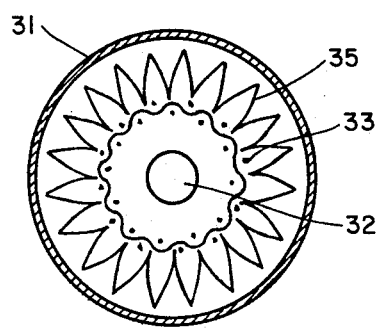
FIG. 7 is a cross-section of the filter device showing a pleated glass fiber mat filter element in place.

Tests have been carried out which demonstrate the structural integrity of the quaternary ammonium silicate bonded glass fiber filter elements in a pulsating high temperature exhaust gas environment. In one test, a cylindrical pleated filter element similar to that shown in FIGS. 6 and 7 was constructed. It had a 2-inch inside diameter and a 6-inch outside diameter and was 22 inches long. It provided about 80 square feet of filter area. It was made of quaternary ammonium silicate bonded glass fiber mat impregnated with fine asbestos fiber. It was installed in the exhaust system of a 1969 automobile having a 307 cubic inch V-8 engine. Previous tests had shown that similar glass filters, even those made of woven glass cloth, would develop holes in from 6 to about 24,000 miles. The above test with the quaternary ammonium silicate bonded filter was continued for 44,000 miles, at which time the filter was disassembled and the filter element inspected. It was found to be intact and had not developed any holes.

We claim:

1. A filter element having structural integrity and resistance to high temperatures suitable for use in the exhaust stream of an internal combustion engine, said filter comprising a glass fiber mat bonded together throughout said mat with a quaternary ammonium silicate binder.

2. A filter element of claim 1 wherein said glass fibers are randomly entangled to form said mat.

3. A filter element of claim 2 wherein a major amount of said glass fibers are at least one-half inch long.

4. A filter element of claim 3 containing a porosityreducing amount of a fine fiber selected from asbestos fiber and micro-glass fiber.

5. A filter element of claim 4 wherein said fine fiber is concentrated near one surface of said mat and gradually decreases in concentration towards the other surface of said mat.

6. A mat of claim 5 wherein said fine fiber is asbestos fiber.

7. A mat of claim 5 wherein said fine fiber is micro-glass fiber.

8. A filter element of claim 3 wherein up to about 10 weight per cent of the glass fibers forming said mat are in the form of bundles containing a plurality of glass fibers.

9. A filter element of claim 8 containing a porosityreducing amount of a fine fiber selected from asbestos fiber and micro-glass fiber.

10. In an exhaust system for an internal combustion engine, said system comprising an exhaust conduit for conducting the exhaust gas from said engine to an exhaust location, the improvement wherein said exhaust conduit includes a filter, said filter comprising a housing having an exhaust gas inlet and outlet, said housing defining an exhaust flow path from said inlet to said outlet, and a filter element within said housing disposed across said flow path such that all of said exhaust gas passing through said housing passes through said filter element, said filter element comprising a porous mat of glass fibers bonded together throughout said mat with a quaternary ammonium silicate binder.

11. An exhaust system of claim 10 wherein said glass fibers are randomly entangled to form said mat.

12. An exhaust system of claim 11 wherein said mat contains a porosity-reducing amount of micro-glass fiber.

13. An exhaust system of claim 11 wherein said mat contains a porosity-reducing amount of asbestos fiber.

14. An exhaust system of claim 13 wherein said asbestos fiber is concentrated near one surface of said mat and gradually decreases in concentration towards the other surface of said mat, said other surface of said mat being nearest said engine.

* * * * *